(12) United States Patent  
Yang et al.

(10) Patent No.: US 8,749,969 B2  
(45) Date of Patent: Jun. 10, 2014

(54) SCREEN POSITION ADJUSTMENT FOR A LAPTOP COMPUTER

(76) Inventors: Hong Yang, Edmonton (CA); Xin Ma, San Mateo, CA (US)

( * ) Notice: Subject to any disclaimer, the term of this patent is extended or adjusted under 35 U.S.C. 154(b) by 351 days.

(21) Appl. No.: 13/405,161

(22) Filed: Feb. 24, 2012

(65) Prior Publication Data

US 2013/0050924 A1 Feb. 28, 2013

Related U.S. Application Data

(63) Continuation of application No. 13/217,111, filed on Aug. 24, 2011, now abandoned.

(51) Int. Cl.  
*G06F 1/16* (2006.01)

(52) U.S. Cl.  
USPC .................. 361/679.55; 455/575.4; 312/294; 16/341; 345/173

(58) Field of Classification Search  
USPC ......... 345/158, 619, 173, 168, 156, 204, 690, 345/419, 681, 175, 545, 211, 522, 208, 89; 16/337, 371, 50, 277, 297, 319, 341, 16/284, 239, 221; 312/326, 223.2, 258, 312/7.2, 204, 223.3, 265.6, 294; 455/41.2, 455/226.2, 226.1, 41.1, 575.4, 566, 567, 455/406; 340/14.08; 361/679.09, 679.01, 361/679.03, 679.28, 679.2, 679.27, 679.04, 361/679.08, 679.29, 679.54, 679.55, 361/679.57, 679.26, 679.43, 679.07, 361/679.46, 679.15, 679.16  
See application file for complete search history.

(56) References Cited

U.S. PATENT DOCUMENTS

| | | | |
|---|---|---|---|
| 2006/0181607 A1* | 8/2006 | McNelley et al. | 348/14.08 |
| 2007/0206349 A1* | 9/2007 | Jacobs | 361/683 |
| 2013/0178161 A1* | 7/2013 | Shulenberger | 455/41.2 |

* cited by examiner

*Primary Examiner* — Hung Duong

(57) ABSTRACT

An adjustable hinge connects a base section and a top section of a laptop computer. The base section can include a keyboard. The top section can include a display screen. When the laptop computer is in a closed position, the adjustable hinge can collapse into the base section and the top section. When the laptop computer is in an open position, a portion of the adjustable hinge can be extended from the base section to adjust a distance between the display screen and a user. Another portion of the adjustable hinge can be extended from the top section to adjust a height of the display screen.

13 Claims, 4 Drawing Sheets

SCREEN POSITION ADJUSTMENT FOR A LAPTOP COMPUTER

TECHNICAL FIELD

This application is a continuation application and claims the benefit of priority under 35 U.S.C. Section 120 of U.S. application Ser. No. 13/217,111, filed on Aug. 24, 2011, entitled "Screen Position Adjustment for a Laptop Computer." The disclosure of the prior application is considered part of and is incorporated by reference in the disclosure of this application.

The disclosed implementations are generally related to laptop computer ergonomics.

BACKGROUND

A laptop computer, also known as a notebook computer, is a portable personal computing device for mobile use. A typical laptop computer can include a keyboard and a screen. Due to size constraints, the keyboard is often directly connected to the screen. In addition, most laptop keyboards are small and cause awkward postures in a user's wrists and hands. Proper adjustment of a workstation is extremely important in injury prevention. However, conventional laptop computer placed directly on a desktop does not allow the monitor or keyboard to be adjusted to a height appropriate for the user. To prevent injury, people often use accessories such as external keyboards, docking stations, external monitors, or laptop stands. However, these accessories may not always be carried with a laptop computer, and can incur additional costs.

SUMMARY

An adjustable hinge connects a base section and a top section of a laptop computer. The base section can include a keyboard. The top section can include a display screen. When the laptop computer is in a closed position, the adjustable hinge can collapse into the base section and the top section. When the laptop computer is in an open position, a portion of the adjustable hinge can be extended from the base section to adjust a distance between the display screen and a user. Another portion of the adjustable hinge can be extended from the top section to adjust a height of the display screen.

In general, in some implementations, the techniques are implemented on a mobile device (e.g., a laptop computer). The mobile device includes a base section coupled to a keyboard, a top section coupled to a display screen, and a hinge connecting the top section to the base section. The hinge can include a screen height adjustment member and a screen distance adjustment member. The screen height adjustment member and the screen distance adjustment member are connected to an axis of the hinge and are configured to rotate around the axis to assume an open position or a closed position. The top section is connected to the hinge through the screen height adjustment member such that, when the hinge assumes an open position, an adjustment of the screen height adjustment member causes the top section to move up or down in a sliding motion along the screen height adjustment member of the hinge. The base section is connected to the hinge through the screen distance adjustment member such that, when the hinge assumes the open position, an adjustment of the screen distance adjustment member causes the base section to move back and forth from the axis in a sliding motion along the screen distance adjustment member section of the hinge.

In some implementations, each of the screen height adjustment member and the screen distance adjustment member can include one or more telescopic sleeves. In some implementations, each of the screen height adjustment member and the screen distance adjustment member can include can include one or more rails along which the top section or base section moves in a sliding motion.

In some implementations, the top section is connected to a top of the screen height adjustment member using a rotating member, such that a view angle of the display screen of the top section is adjustable through the rotating member. The top section can include a supporting member, the supporting member operable to support the top section and to prevent mobile device from tipping back when the top section has moved up along the screen height adjustment member.

The subject matter of this disclosure can be utilized to achieve the following advantages. A laptop computer implementing the techniques can have better ergonomics than a conventional laptop computer. Distance between the keyboard and display screen can be adjusted. When the laptop computer is placed on a desktop, a user can adjust the distance to make the laptop computer comfortable to use. Portability of the laptop computer implementing the techniques is not compromised. No external keyboard, docking station, external monitor, or laptop stand is necessary for ergonomic use of the laptop computer.

DESCRIPTION OF DRAWINGS

Like reference symbols in the various drawings indicate like elements.

DETAILED DESCRIPTION

Figure 1:
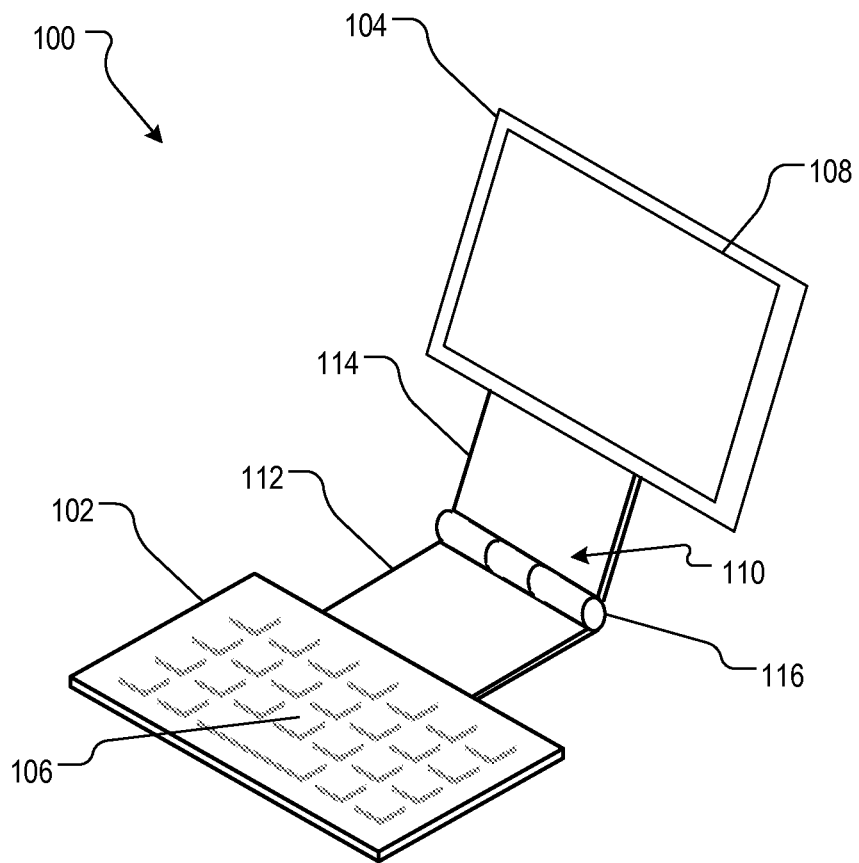
FIG. 1 is a diagram providing an example of the techniques described.

FIG. 1 is a diagram providing an example of the techniques described. Mobile device 100 can be a laptop computer. The mobile device 100 includes a base section 102 and a top section 104. The base section 102 and top section 104 can be closed when the mobile device 100 is not in use, and opened when a user uses the mobile device 100. The base section 102 can include a keyboard 106. The top section 104 can include display screen 108.

An adjustable hinge 110 connects the base section 102 and the top section 104. The adjustable hinge 110 includes a screen distance adjustment member 112 and a screen height adjustment member 114. An axis 116 connects the screen distance adjustment member 112 and the screen height adjustment member 114, and allows the screen distance adjustment member 112 and the screen height adjustment member 114 to rotate around the axis 116 to form an angle between the screen distance adjustment member 112 and the screen height adjustment member 114.

The screen distance adjustment member 112 connects the base section 102 to the axis 116. The screen distance adjustment member 112 can have an adjustable length, or configured to allow the base section 102 to move along the screen distance adjustment member 112 in a direction to or from the axis 116. The distance between the base section 102 and the axis 116 can be adjustable by adjustment of the length of the screen distance adjustment member 112 or by movement of the base section 102. The distance between the base section 102 and the axis 116 can be adjusted according a user's preference on how far away the keyboard 106 is placed from the display screen 108.

The screen height adjustment member 114 connects the top section 104 to the axis 116. The screen height adjustment member 114 can have an adjustable length, or configured to allow the top section 104 to move along the screen height adjustment member 114 in a direction to or from the axis 116. The distance between the top section 104 and a desktop can be adjustable by adjustment of the length of the screen height adjustment member 114 or by movement of the top section 104. The distance between the top section 104 and the desktop can be adjusted according to a user's preference on the viewing height of the screen 108 for comfortable viewing.

The axis 116 can be a lockable axis that, when locked, fixes an angle between the screen distance adjustment member 112 and the screen height adjustment member 114. When the axis 116 is unlocked, the angle can be adjusted by rotation of the screen distance adjustment member 112 and the screen height adjustment member 114 around the axis 116. The angle can be adjusted according to a user's preference on a viewing angle of the display screen 108.

Figure 2A:
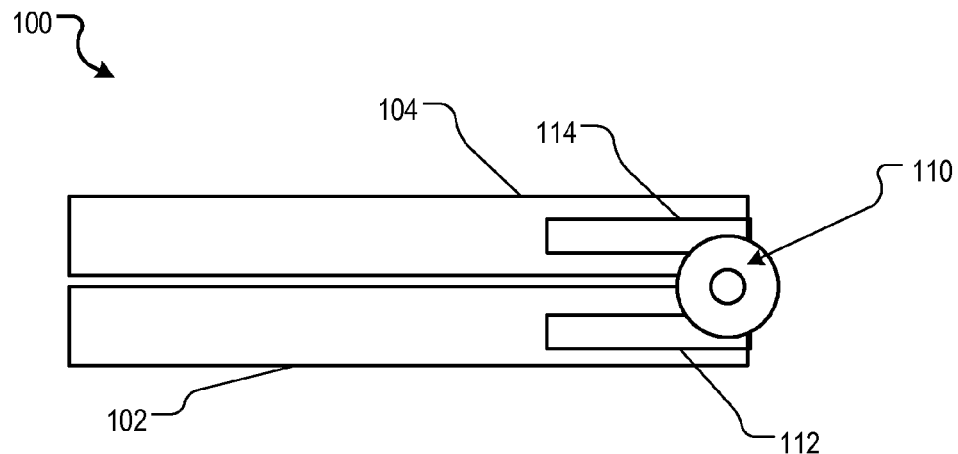
FIGS. 2A and 2B are diagrams illustrating example positions of an adjustable hinge.
Figure 2B:
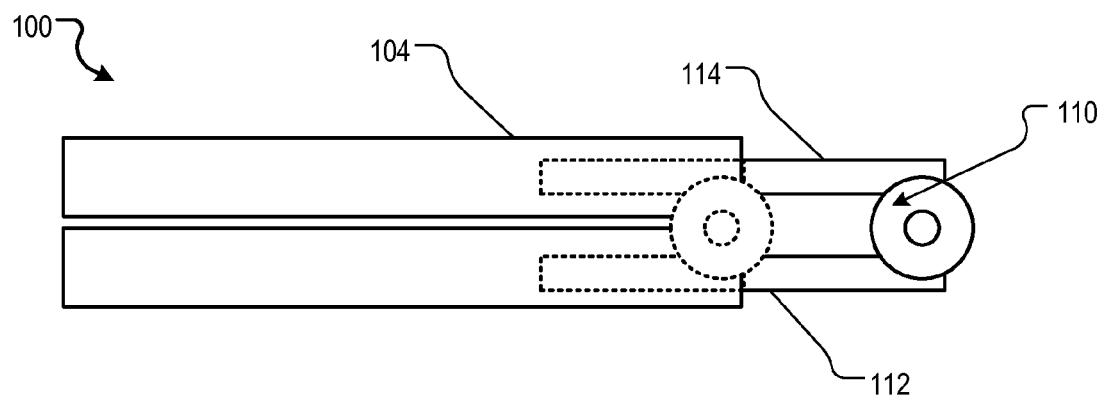

FIGS. 2A and 2B are diagrams illustrating example positions of adjustable hinge 110. FIG. 2A illustrates a collapsed position of adjustable hinge 110. Mobile device 100 is in a closed position, where base section 102 and top section 104 are closed. The adjustable hinge 110 is in a collapsed position, where the screen distance adjustment member 112 is inside of the base section 102, and the screen height adjustment member 114 is inside of the top section 104. The adjustable hinge 110 can be manually pushed into the collapsed position, or be retrieved into the collapsed position automatically by a mechanism inside of the adjustable hinge 110, a mechanism inside of the base section 102, a mechanism inside of the top section 104, or a combination of the above. The mobile device 100 can maintain a portable size when the adjustable hinge 110 is in a collapsed position.

FIG. 2B illustrates an extended position of adjustable hinge 110. Mobile device 100 is in a closed position, where base section 102 and top section 104 are closed. The adjustable hinge 110 is in an extended position, where at least a portion of the screen distance adjustment member 112 is outside of the base section 102, and at least a portion of the screen height adjustment member 114 is outside of the top section 104. The adjustable hinge 110 can be manually pulled into the extended position, or be propelled into the collapsed position automatically by a mechanism inside of the adjustable hinge 110, a mechanism inside of the base section 102, a mechanism inside of the top section 104, or a combination of the above.

Figure 3:
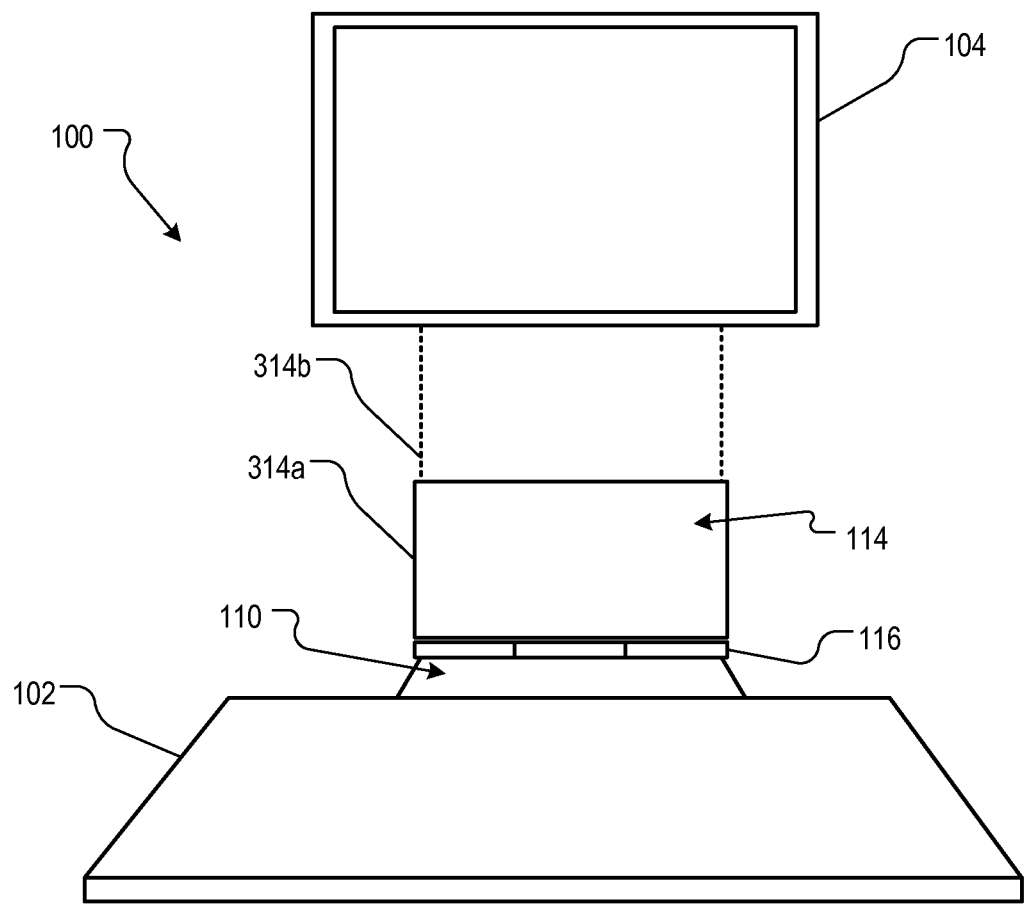
FIG. 3 is a diagram illustrating example implementations of screen height adjustment of a laptop computer.

FIG. 3 is a diagram illustrating example implementations of screen height adjustment of a laptop computer. Mobile device 100 is in an open position, where base section 102 and top section 104 are open. Adjustable hinge 110 connects the base section 102 and the top section 104. Adjustable hinge 110 includes an adjustable screen height adjustment member 114. The adjustable screen height adjustment member 114 includes a first member 314a connected to axis 116 of the adjustable hinge 110, and a second member 314b connected to the top section 104. The first member 314a can be a sleeve. The second member 314b can be a body that can collapse into or extend out of the sleeve. The height of the top section 104, which can be a distance between the top section and a desktop when the mobile device 100 is placed on a desktop, can be adjusted by collapsing and extending the second member 314b into or out of the first member 314a of the screen height adjustment member 114.

Figure 4:
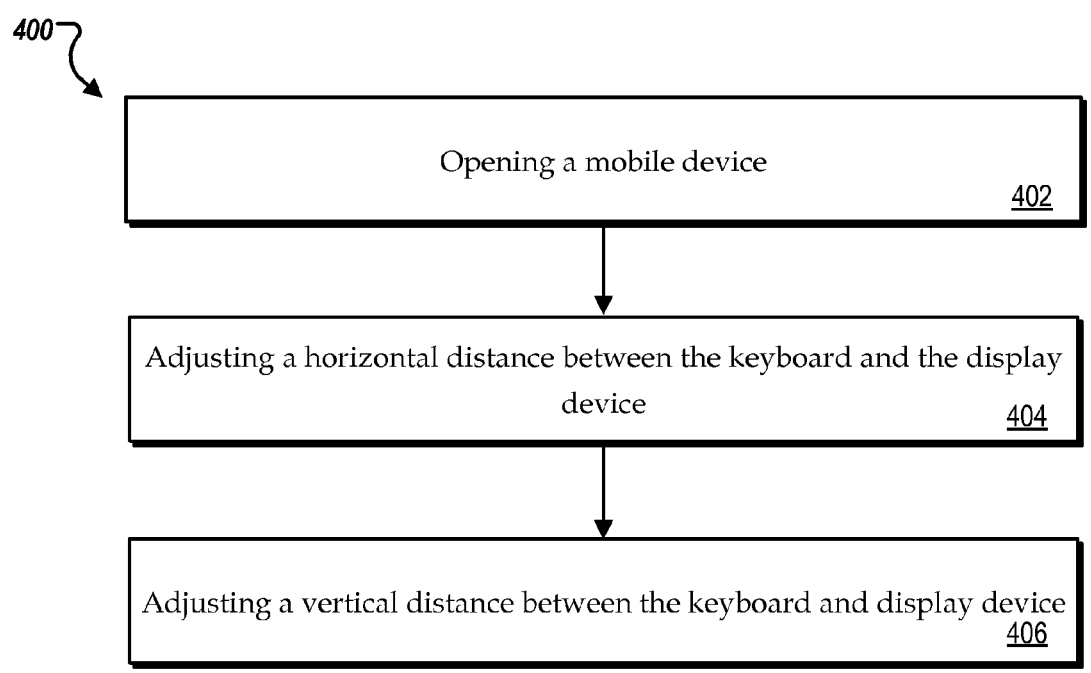
FIG. 4 is a flowchart illustrating an example process implementing the techniques.

FIG. 4 is a flowchart illustrating an example process 400 implementing the techniques. Process 400 can be implemented on a laptop computer.

Process 400 includes opening (402) a mobile computing device, such that a keyboard of the computing device and a display device of the mobile computing device are in an open position. The keyboard and the display device are connected through a hinge, the keyboard being connected to a first member of the hinge, the display device being connected to a second member of the hinge. The first member of the hinge and the second member of the hinge are connected to an axis of the hinge and are configured to rotate around the axis, such that the keyboard and the display device can form various angles.

Process 400 includes adjusting (404) a horizontal distance between the keyboard and the display device, including sliding the keyboard along the first member of the hinge. Adjusting the horizontal distance between the keyboard and display device includes adjusting a horizontal position of the keyboard, including moving the keyboard along the first member of the hinge using a keyboard position adjustment member, such that a distance between the display device and the keyboard changes without changing a folding angle of the hinge connecting the display device and the keyboard.

Process 400 includes adjusting (406) a vertical distance between the keyboard and display device, including sliding the display device along the second member of the hinge. Adjusting the vertical distance between the keyboard and display device includes adjusting a vertical position of the display device, including raising or lowering the display device along the second member of the hinge using a screen height adjustment member, such that a distance between the display device and the keyboard changes without changing a folding angle of the hinge connecting the display device and the keyboard.

In some implementations, when the display device is in a raised position, a supporting member connected to the display device can be extended to a supporting surface (e.g., a desktop) to prevent the mobile computing device from tipping over.

A number of implementations of the invention have been described. Nevertheless, it will be understood that various modifications can be made without departing from the spirit and scope of the invention. For example, movement of a display screen is described as a sliding motion. Other modes of motion are possible. An adjustment member of a hinged is described as a sleeve. Other implementations are possible. For example, an adjustment member can be a folding member, a vertically rotating member, or a screw.

What is claimed is:

1. A mobile computing device, comprising:
a base section being coupled to a keyboard;
a top section being coupled to a display screen; and
a hinge connecting the top section to the base section, the hinge including a screen height adjustment member and a screen distance adjustment member,
wherein:
the top section is connected to the hinge through the screen height adjustment member such that, when the hinge assumes an open position, an adjustment of the screen height adjustment member causes the top section to move up or down in a sliding motion along the screen height adjustment member of the hinge; and the base section is connected to the hinge through the screen distance adjustment member such that, when the hinge assumes the open position, an adjustment of the screen distance adjustment member causes the base section to move back and forth from the top section in a sliding motion along the screen distance adjustment member section of the hinge.

2. The device of claim 1, wherein each of the screen height adjustment member and the screen distance adjustment member comprises one or more telescopic sleeves.

3. The device of claim 1, wherein each of the screen height adjustment member and the screen distance adjustment member comprises one or more rails along which the top section or base section moves in a sliding motion.

4. The device of claim 3, wherein the top section is connected to a top of the screen height adjustment member using a rotating member, such that a view angle of the display screen of the top section is adjustable through the rotating member.

5. The device of claim 1, wherein the top section comprises a supporting member, the supporting member operable to support the top section and to prevent mobile computing device from tipping back when the top section has moved up along the screen height adjustment member.

6. The device of claim 1, wherein the device is a laptop computer.

7. The device of claim 1, wherein the hinge includes a distance adjustment member being connected to the base section, the distance adjustment member being configured to adjust a distance between the top section and the base section.

8. A method, comprising:
opening a mobile computing device, such that a keyboard of the computing device and a display device of the mobile computing device are in an open position, wherein the keyboard and the display device are connected through a hinge, the keyboard being connected to a first member of the hinge, the display device being connected to a second member of the hinge;
adjusting a horizontal distance between the keyboard and the display device, including sliding the keyboard along the first member of the hinge; and
adjusting a vertical distance between the keyboard and display device, including sliding the display device along the second member of the hinge, wherein the first member of the hinge and the second member of the hinge are connected to an axis of the hinge and are configured to rotate around the axis.

9. The method of claim 8, wherein adjusting the vertical distance between the keyboard and display device includes adjusting a vertical position of the display device, including raising or lowering the display device along the second member of the hinge using a screen height adjustment member, such that a distance between the display device and the keyboard changes without changing a folding angle of the hinge connecting the display device and the keyboard.

10. The method of claim 8, wherein adjusting the horizontal distance between the keyboard and display device includes adjusting a horizontal position of the keyboard, including moving the keyboard along the first member of the hinge using a keyboard position adjustment member, such that a distance between the display device and the keyboard changes without changing a folding angle of the hinge connecting the display device and the keyboard.

11. The method of claim 8, comprising:
when the display device is in a raised position, extending a supporting member connected to the display device to a supporting surface to prevent the mobile computing device from tipping over.

12. The method of claim 8, wherein the axis is a lockable axis.

13. The method of claim 8, wherein the mobile computing includes a laptop computer.

* * * * *